3,157,606
FATTY OIL MODIFIED POLYCARBONATE RESINS
AND PROCESSES FOR PRODUCING SAME
Rudolph D. Deanin, West Hartford, Conn., and Ann V. Pinter, Morristown, N.J., assignors to Allied Chemical Corporation, New York, N.Y., a corporation of New York
No Drawing. Filed May 12, 1961, Ser. No. 109,489
20 Claims. (Cl. 260—18)

The present invention relates to new and useful polycarbonate resins and processes for preparing them.

More specifically, the present invention resides in fatty oil modified polycarbonate resins derived from bisphenols having the structure

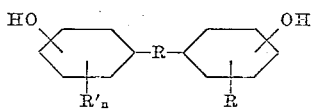

in which R is a divalent alkane or saturated alicyclic radical or a divalent aryl or aralkyl radical containing only aromatic unsaturation, R' is a monovalent alkane radical and $n$ is an integer from 0 to 4, and the derivatives of those bisphenols which contain halogen attached to carbon in an aromatic ring.

Conventionally polycarbonate resins are prepared by either phosgenation or transesterification. In the phosgenation method phosgene is reacted with a bisphenol in an aqueous alkaline medium, preferably in the presence of a catalyst and a solvent for the polycarbonate resin formed. Alternatively, the phosgene may be reacted with a bisphenol in pyridine, where pyridine acts as the hydrohalide acceptor and as solvent for the polycarbonate resin formed, and possibly also as catalyst. Preferably the solvent function of the pyridine is replaced in whole or in part by the addition of lower cost solvents. The transesterification method involves the transesterification of a bisphenol and a carbonic acid diester, especially diphenyl carbonate. The transesterification reaction is preferably conducted at elevated temperatures and at reduced pressures.

Polycarbonate resins prepared by any of the foregoing methods yield poor coating compositions, for example, polycarbonate resins prepared by any of the above procedures and applied by conventional methods as coatings to aluminum or steel give inflexible coatings having poor adhesion. When these coatings are baked at elevated temperatures (on the order of 200° C.) the adhesion is somewhat improved, but the flexibility remains poor. Furthermore, the initial polymer is not soluble enough in common lacquer solvents, nor readily emulsifiable; while the final coating is too readily attacked by solvents. When the foregoing polycarbonate reactions are conducted in the presence of a fatty oil the resulting polycarbonate product still yields poor coating compositions, for example, when polycarbonate resins so prepared are applied by conventional methods as coatings to aluminum or steel the resulting coatings are cloudy to opaque and are characterized by having poor adhesion unless baked at elevated temperatures.

It is therefore an object of the present invention to provide new and useful polycarbonate resins and processes for preparing them, which resins find utility in a wide variety of applications, for example, moldings, films, coatings, etc.

It is a further object of the present invention to prepare new and versatile polycarbonate resins inexpensively and expeditiously.

It is a still further object of the present invention to prepare polycarbonate resins having excellent physical characteristics.

It is a particular object of the present invention to prepare polycarbonate resins useful in the preparation of coating compositions, which resins provide coatings having excellent physical properties, such as clarity, impact, flexibility, color, etc.

It is a further object of the present invention to provide novel polycarbonate resins useful in the preparation of coating compositions which exhibit excellent adhesion without the necessity of baking at high temperatures.

Further objects and advantages of the present invention will appear hereinafter.

According to the present invention we have found that new and useful polycarbonate resins may be prepared, accomplishing the foregoing objects and advantages of the present invention, by (1) reacting together from about 10 to about 90 weight percent of a fatty oil and from about 90 to about 10 weight percent of a bisphenol, as defined below, at a temperature between the melting point and the boiling point of said bisphenol, (2) reacting the resulting reaction product with an ester forming derivative of carbonic acid selected from the group consisting of phosgene and a carbonic acid diester, and (3) recovering the resulting polycarbonate resin.

The reaction between the fatty oil and the bisphenol is conducted at elevated temperatures, and atmospheric pressure may be employed. The temperature of reaction may vary between the melting point and the boiling point of the bisphenol, for example, when 2,2-(4,4'-dihydroxydiphenyl)-propane, also known as p,p'-isopropylidenediphenol, hereinafter referred to as Bis-phenol-A, is employed the temperature may vary between about 157° C. and about 370° C., depending upon the purity of the Bis-phenol-A. It has been found that for Bis-phenol-A the preferred temperature range is between about 275° C. and about 330° C. The time of the reaction may vary within a wide range depending upon reactants and reaction temperatures; generally, however, the reaction is continued until the reaction mass becomes homogeneous, with at least 5 or 10 minutes being required at the higher temperatures and at least 4 or 5 hours at the lower temperatures. Extended reaction times may be employed without adverse effect, for example, reaction times on the order of 10 to 20 hours. The fatty oil bisphenol reaction product is preferably prepared from about 10 to about 60 weight percent of fatty oil, and correspondingly from about 90 to about 40 weight percent of bisphenol, and more preferably being from about 55 to about 75 weight percent of bisphenol. After the desired reaction time the entire reaction mass is reacted with either phosgene or a carbonic acid diester, and the resulting polycarbonate resin separated from the reaction mixture. The fatty oil-bisphenol reaction product is readily flowable at the temperatures of reaction, viz., between about the boiling point and melting point of the bisphenol. When the product is cooled to room temperature, however, it becomes thick and syrupy. It is, therefore, desirable to dissolve the product in a solvent in order to obtain the preferred ambient temperature viscosity for the polycarbonate reaction. Any solvent regularly used for polycarbonate resins is suitable for this purpose, for example, methylene chloride.

The fatty oil employed in the present invention is a glyceride oil and may be either of the semi-drying, drying or non-drying type. In addition, the fatty oil may be saturated or unsaturated, and may be either of the vegetable, animal, or fish type. The oil itself may be employed in the present invention or the fatty acid from which the oil is derived plus glycerine may be employed, since when fatty acids are combined with glycerine they give fatty oil glycerides which are the principal constituents of fatty oils, which latter term is intended to include fatty acids plus glycerine. Illustrative fatty oils of the vegetable type which may be employed in the present invention are: dehydrated castor oil, linseed oil, perilla oil, soyabean oil, corn oil, cotton seed oil, tall oil, coconut oil, olive oil, peanut oil, sunflower oil, poppyseed oil, safflower oil, oiticica oil, and tung oil. Illustrative animal and fish oils which may be employed are: whale oil, menhaden oil, sardine oil, herring oil, and codliver oil. Illustrative fatty acids from which the oil is derived which may be employed in combination with glycerine are: lauric acid, myristic acid, palmitic acid, oleic acid, stearic acid, linoleic acid, linolenic acid, clupanodonic acid and fatty acids obtained by hydrogenation of fish, animal or vegetable oils or fats. Mixtures of any of the above fatty oils may also be employed.

Our fatty oil modified bisphenol polycarbonates can be produced by processes herein described from the polycarbonates, prepared in konwn manners, of bisphenols having the structure

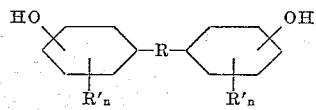

in which R is a divalentalkane or saturated alicyclic radical or a divalent aryl or aralkyl radical containing only aromatic unsaturation, R' is a monovalent alkane radical and $n$ is an integer from 0 to 4, and the derivatives of those bisphenols which contain halogen attached to carbon in an aromatic ring. The polycarbonates of the bisphenols having the above structure in which each of the two hydroxyl groups is in the 4-position of a phenylene radical and are linked through a single carbon atom of a divalent alkane radical, are the preferred bisphenol polycarbonates reacted with fatty oils in accordance with our invention.

The following are examples of such bisphenols:

(4,4'-dihydroxy-diphenyl)-methane,
2,2-(4,4'-dihydroxy-diphenyl)-propane, (Bis-phenol-A),
1,1-(4,4'-dihydroxy-diphenyl)-cyclohexane,
1,1-(4,4'-dihydroxy-3,3'-dimethyl-diphenyl)-cyclohexane,
2,2-(2,2'-dihydroxy-4,4'-di-tert-butyl-diphenyl)-propane,
3,4-(4,4'-dihydroxy-diphenyl)-hexane,
1,1-(4,4'-dihydroxy-diphenyl)-1-phenyl-ethane,
2,2-(4,4'-dihydroxy-diphenyl)-butane,
2,2-(4,4'-dihydroxy-diphenyl)-pentane,
3,3-(4,4'-dihydroxy-diphenyl)-pentane,
2,2-(4,4'-dihydroxy-diphenyl)-3-methyl-butane,
2,2-(4,4'-dihydroxy-diphenyl)-hexane,
2,2-(4,4'-dihydroxy-diphenyl)-4-methyl-pentane,
2,2-(4,4'-dihydroxy-diphenyl)-heptane,
4,4-(4,4'-dihydroxy-diphenyl)-heptane,
2,2-(4,4'-dihydroxy-diphenyl)-tridecane, and
1,4-(4,4'-dihydroxy-dicumyl)-benzene, as well as the halogen derivatives of those bisphenols, e.g., 2,2-(4,4'-dihydroxy-3,3'-dichloro-diphenyl)-propane,
2,2-(4,4'-dihydroxy-3,5,3',5'-tetrabromo-diphenyl)-propane, and
1,4-(4,4'-dihydroxy-dicumyl)-tetrachlorobenzene.

In addition, mixtures of the foregoing bisphenols may be employed.

The polycarbonate resin is prepared by reacting the fatty oil-bisphenol reaction product with either phosgene (phosgenation method) or with a carbonic acid diester (transesterification method) and the resulting polycarbonate resin separated from the reaction mixture. The phosgenation method includes the aqueous alkaline procedure and the pyridine procedure.

When the aqueous alkaline procedure is employed the phosgene is preferably slowly introduced in an aqueous alkaline solution containing the fatty oil-bisphenol reaction product. The phosgene to fatty oil-bisphenol reaction product ratio is not critical. Practically, however, at least 0.1 mol of phosgene is employed per mol of bisphenol in said reaction product. Due to side reactions of the phosgene, it is preferred to employ from 1.1 to 2 mols of phosgene per mol of bisphenol. Greater amounts of phosgene may be employed, if desired, but the additional phosgene is merely unconsumed. If less than one mol of phosgene is employed the fatty oil-bisphenol reaction product is not utilized to the fullest extent.

The phosgene is preferably introduced into the aqueous alkaline solution slowly, over a period of time generally on the order of 15 minutes to four hours. When the reaction is run continuously, naturally the phosgene will be continuously introduced. When all the phosgene has been added there generally follows a molecular weight growth period during which the reaction mixture is stirred and polycarbonate resin grows in molecular weight.

The temperature of the aqueous alkaline phosgenation reaction may vary within a wide range, that is, the reaction may be conducted at room temperature or lower or higher temperatures as desired. Generally temperatures from the freezing point to the boiling point of the mixture may be utilized. It has been found that there is a tendency for molecular weight increase at the higher temperatures. Atmospheric pressure may be employed.

It is preferred to employ a suitable solvent for the polycarbonate resin in order to retain the polycarbonate in solution, since molecular weight growth occurs in solution. If no solvent is employed only low molecular weight polymer is produced and this polymer precipitates from solution substantially as fast as formed. The polymer should be soluble in the solvent which is employed, and the solvent should be inert under the conditions of the reaction, immiscible in water and have a sufficiently high boiling point to allow for reaction at elevated temperatures, if desired. Generally speaking, it is preferred to employ a solvent which has a boiling point of 30° C. to 80° C. The solvent is preferably added initially, and added in amounts so that the final polymeric solution is fluid. The amount of solvent is not critical, but practically from 0.1 to 50 parts by weight of solvent per part of polycarbonate formed should be used. Typical solvents include methylene chloride, benzene, cyclohexane, methylcyclohexane, toluene, xylene, chloroform, carbon tetrachloride, trichloroethylene, dichloroethane, methylacetate and ethylacetate.

It is also preferred in this process to employ a catalytic amount of a catalyst for the reaction, with any of the conventional catalysts being applicable. The catalyst is preferably employed in amounts from about 0.05 to about 5.0 percent by weight based on bisphenol, and it is preferred to employ a quaternary ammonium compound. Typical catalysts include the following: quaternary ammonium compounds, such as the halides or hydroxides, for example, benzyl triethyl ammonium chloride, tetramethyl ammonium hydroxide, benzyl trimethyl ammonium fluoride, octadecyl triethyl ammonium chloride, dodecyl trimethyl ammonium chloride, benzyl phenyl dimethyl ammonium chloride, cyclohexyl trimethyl ammonium bromide, etc.; tertiary amines, such as trimethylamine, dimethyl aniline, diethyl aniline, etc. The use of these and other catalysts will be apparent to one skilled in the art. The catalyst may be added either before or after the phosgenation period.

The aqueous alkaline solution may be formed from an alkali metal base, preferably employing an excess of base, such as lithium, sodium, or potassium hydroxide.

The polycarbonate resin may be recovered from solution by conventional means, for example, a non-solvent for the polycarbonate resin may be added to the reaction mixture in order to precipitate the polycarbonate resin. Typical non-solvents include methanol, isopropanol, etc. Other methods for recovery of the polycarbonate resin include steam distillation or evaporation of the solvent.

Potential chain terminators may be employed in the process of the present invention in order to limit the molecular weight. Typical of such compounds are phenol, tertiary butyl phenol, chlorophenol, nonyl alcohol, butyl alcohol, etc.

Various additives may be employed, such as anti-oxidants, and additives to preferentially react with phosgene decomposition products. Typical of such additives are sodium dithionite, potassium bisulfite, carbon monoxide, etc.

In the pyridine procedure pyridine functions as the hydro-halide acceptor, the solvent and in addition possibly as the catalyst. The phosgene is preferably slowly introduced into a stirred solution of the fatty oil-bisphenol reaction product in pyridine, with a somewhat exothermic reaction ensuing. Preferably pyridine is replaced in its solvent function by conventional lower cost polycarbonate resin solvents. The desired solvent may be selected from any of the polycarbonate resin solvents listed above. Generally at least one mol of pyridine per mol of bisphenol in the reaction product is required, with the preferred amount being from about three to about five mols. Additional amounts of pyridine may, of course, be employed if desired. At some point in the reaction pyridine hydrochloride begins to crystallize out of the mixture. As the stoichiometric amount of phosgene is reached the reaction mixture turns viscous. The polymer may then be recovered from the reaction mixture by conventional means, for example, by being precipitated by non-solvents for the polycarbonate resin, such as methanol and isopropanol, or by steam distillation or evaporation of the solvent. The ratio of phosgene employed and the temperature and pressure of the reaction are the same as in the aqueous alkaline procedure outlined above. In addition, the aforementioned chain terminators and additives may also be employed. It should be noted that special care must be taken to wash out all of the pyridine and pyridine hydrochloride from the reaction mixture in order that the final precipitated polymer will be free of contamination.

In the transesterification procedure the fatty oil-bisphenol reaction product is transesterified with a carbonic acid diester, preferably at elevated temperatures and reduced pressures, with the amount of carbonic acid diester not being critical. Practically, however, at least 0.1 mol of carbonic acid diester is employed per mol of bisphenol in the fatty oil-bisphenol reaction product. It is preferred to conduct the transesterification reaction at temperatures of from about 50° C. to about 320° C., especially from about 120° C. to about 280° C., and pressures up to about 50 millimeters of mercury. The preferred carbonic acid diester is diphenyl carbonate, but others which may be employed include the following carbonates: dimethyl; diethyl; dipropyl; dibutyl; diamyl; dioctyl; dicyclohexyl; and di-o,p-tolyl. In the normal operation the reaction mixture is held under 185° C. at relatively poorer vacuum until about 80 to 90 percent of the phenol of condensation has been removed. At this point the temperature is raised to above 185° C. and the pressure is reduced to high vacuum to drive off remaining phenol. As the reaction proceeds the melt viscosity increases and the molecular weight grows. The polycarbonate resin may be removed from the reaction vessel by conventional means. Catalytic amounts of standard transesterification catalysts may be employed, if desired. Preferably, the catalyst is employed in amounts 0.1 to 5 percent based on the bisphenol. Suitable catalysts include lithium, sodium, potassium, calcium, beryllium, magnesium, zinc, cadmium, aluminum, chromium, molybdenum, manganese, iron, cobalt, nickel, copper, silver, mercury, tin, lead, bismuth, antimony, platinum and palladium. These metallic catalysts may be used in any desired form, such as powder, chips, ribbon, wire, etc. However, the preferred catalysts of the present invention are oxides and salts of metals, such as carbonates, chlorides, acetates, borates, or oxides of materials such as magnesium, lead, cobalt, cerium, or antimony. Suitable catalysts of this type include, for example, magnesium oxide, lead dioxide, cobaltous acetate tetrahydrate, ceric oxide, antimony trioxide, etc.

The polycarbonates obtained by the process of the present invention have outstanding properties desired but not obtainable by the conventional polycarbonate resins. Typical of the properties of the polycarbonates of this invention are:

Drop impact _____ 26–28 inch pounds.
Adhesion (tape) _____ No film loss.
Mandrel _____ No cracking.
Sward rocker hardness _____ 56.
Gloss _____ Good.
Clarity _____ Clear.

The above tests are described in "Physical and Chemical Examination: Paints, Varnishes, Lacquers, Colors. Eleventh Edition, 1950."

One difficulty in the use of the prior art coating compositions of polycarbonates is the requirement of baking at high temperatures about 200° C. in order to attain adhesion and flexibility. Coating compositions of polycarbonates of the present invention give good adhesion without baking but with driers, or with baking at low temperatures below about 100° C. This property is very important, practically and economically, and is distinctly superior to the conventional polycarbonates. Another difficulty with the polycarbonate coating compositions is a coating which is cloudy to opaque unless baked at high temperatures of 200° C. or higher; whereas, the coating composition of the present invention gives a clear film without baking. The polycarbonates of the present invention are also quite soluble in common lacquer solvents and readily emulsifiable.

To illustrate the differences between the polycarbonates of the present invention and the conventional polycarbonates, a commercial bisphenol polycarbonate was solution cast (5 to 20% in methylene chloride) onto steel plates and showed poor adhesion and flexibility, unless baked at high temperatures (200° C.). Moreover, the initial polycarbonate is sparingly soluble in common lacquer solvents and not readily emulsifiable. Further, the final coating, even when baked at high temperatures (200° C.), is readily attacked by solvents.

To illustrate the importance of first effecting reaction between a fatty oil and the bisphenol, a solution of Bisphenol-A and dehydrated castor oil in methylene chloride was phosgenated and the resulting product isolated and redissolved in methylene chloride. This solution was then cast on steel plates and it was found that the resulting coatings were cloudy to opaque and also had poor adhesion to steel unless baked at 200° C. From the foregoing it will be evident that the polycarbonates of the present invention have desirable characteristics, particularly the characteristic of resulting in a coating of excellent adhesion and flexibility without baking, a clear coating and good solubility in common lacquer solvents as well as ready emulsifiability.

The coating compositions of the present invention may be conveniently prepared by first dissolving the resin component in a volatile organic solvent and applying the resulting composition to the surface to be coated. Alternatively, since many of the resins of the present invention are prepared in solvent, for example, methylene chloride, the polycarbonate resin solution may be directly applied to the surface to be coated. The coatings may be applied by conventional means, for example, dipping, brushing, spraying or coating with a doctor blade. The coated films have good drying rates and may thereafter be dried and cured at room temperature or moderately elevated temperature to remove solvent. Optionally, driers may be added to accelerate drying and curing time.

The solvent which is employed should be non-reactive and should have a sufficiently low boiling point so that it will vaporize from the composition when coated onto a substrate in a thin film. Solvents having a boiling point between about 30° C. and about 175° C. are suitable. In addition, mixed solvents may be advantageously employed. Suitable solvents include, for example, toluene, xylene, various petroleum hydrocarbon distillate fractions, methylene chloride, isopropyl ether, ethyl acetate, methyl ethyl ketone and cyclohexanone.

The amount of solvent used should vary between about 40 to about 95 percent by weight of the total formulation. Below this range the formulation is too viscous to be used effectively; above it the formulation is too dilute to lay down a coating of adequate thickness and covering power.

The coating compositions of the present invention may be dried and cured at room temperature or at moderately elevated temperature. If desired, driers may be added to accelerate drying and curing time. Under ordinary room temperature conditions without added driers the coatings dry tack-free in from about 0.25 to about 0.5 hour, and are completely cured in from about 4 to about 5 days. In addition, the conventional driers in amounts from about 0.08 to about 0.12 percent by weight of the total composition may be advantageously employed to further cut down drying and curing time. Exemplificative driers include lead, manganese, cobalt and zinc in the form of resinates, linoleates, naphthenates and octyl-oxyacetates.

The dried and cured coating compositions of the present invention are characterized by their excellent physical characteristics. They have excellent adhesion, clarity, flexibility, gloss, color, hardness, tensile strength, resistance to solvents, resistance to discoloration by weathering without undue impairment of flexibility, impact resistance, chemical resistance and abrasion resistance.

The present invention will be more readily apparent from a consideration of the following examples.

*Example 1*

Dehydrated castor oil 22.2 grams and Bis-phenol-A 37 grams are mixed together and heated to 270° C. over a half-hour period, then held at 270° C. to 320° C. for one-half hour, and finally cooled to 30° C. over another half-hour period. This reaction product is dissolved in 500 cubic centimeters of methylene chloride, and charged into a one-liter resin pot containing 31.5 grams of 95 percent NaOH dissolved in 50 cubic centimeters of water. The mixed liquids are stirred under nitrogen flush and reflux condenser, and 6.4 cubic centimeters of 10 percent aqueous solution of benzyl triethyl ammonium chloride catalyst is added. Phosgene gas 27.5 grams is bubbled into the stirred emulsion evenly over a one-hour period, using a cold water bath to keep the temperature at 30° C. The emulsion is stirred for another hour at 30° C. to complete the reaction. The emulsion is acidified with dilute HCl, and the organic layer of copolymer dissolved in methylene chloride is separated, dried over calcium chloride, and concentrated by vacuum evaporation at room temperature to a viscous solution. When this solution is spread on aluminum and steel panels, evaporated, and oven-dried, the resin forms clear, light-colored, adhesive, flexible, and impact-resistant coatings. When 0.1% cobalt-manganese drier is added to the solution, the coatings cure to hard, dry coatings retaining all of the above qualities.

*Example 2*

Coconut oil 6.3 grams and Bis-phenol-A 35.9 grams are mixed together and heated to 300° C. over a half-hour period, held at 282° C. to 330° C. for one-half hour, and cooled to 30° C. over another 35-minute period. Another 15.4 grams of Bis-phenol-A is added, and the mixture phosgenated as in Example 1. The resulting solution of resin in methylene chloride is washed with acid and water, coagulated by slow addition of acetone with methanol with stirring, filtered, and dried. When this solution is spread on aluminum and steel panels, evaporated, and oven-dried, the resin forms clear, light-colored, adhesive, flexible, and impact-resistant coatings. When 0.1% cobalt-manganese drier is added to the solution, the coatings cure to hard, dry coatings retaining all of the above qualities.

*Example 3*

Dehydrated castor oil 22.8 grams and Bis-phenol-A 40 grams are heated together to 270° C. for 30 minutes under a slow stream of nitrogen, then cooled to room temperature. The reaction product is dissolved in 500 cubic centimeters of methylene chloride, and 79 grams of pyridine is added. Phosgene 30 grams is bubbled into the stirred solution over a one-hour period, using a cold-water bath to keep the temperature at 30° C. The solution is stirred another 45 minutes at 30° C. to finish the reaction. The solution is then washed twice with dilute HCl, and once with water, then dried over calcium chloride, filtered, and concentrated by vacuum evaporation. When this solution is evaporated on an aluminum backing, it gives a clear, adhesive, flexible coating. Baking onto steel at 90° C., it gives clear, adhesive, tough, hard, glossy coatings.

*Example 4*

Dehydrated castor oil 44.5 grams and Bis-phenol-A 60 grams are heated under a stream of nitrogen for 45 minutes at 300° C. and then cooled. Diphenyl carbonate 37.6 grams and PbO and ZnO 0.053 gram each are added as a catalyst and the mixture is heated and stirred under vacuum. The reaction is held for 155 minutes at 20 millimeters and 175° C., removing most of the phenol. The reaction is continued for 30 additional minutes at 3.5 millimeters and completed in 30 additional minutes at 200° C. and 1.6 millimeters vacuum during this period. At the end, the molten reaction product is poured out and cooled. When solutions of the foregoing polycarbonate resin in 90% by weight methylene chloride are catalyzed with 0.1 percent of cobalt drier and 0.05 percent manganese drier and coated on steel panels, resulting coatings are dry, smooth, clear, amber, adhesive, flexible on mandrel test, Sward hardness 56, and drop impact 28 inch pounds.

*Example 5*

Dehydrated castor oil 41.9 grams and 1,4-(4,4'-dihydroxy-dicumyl) benzene 45.25 grams are mixed together and heated at 270° C. over a half-hour period, then held at 270° C. to 330° C. for one half-hour, and finally cooled to 30° C. over another half-hour period. This reaction product is dissolved in 500 cubic centimeters of ethylene chloride and charged into a 1-liter resin pot containing 31.5 grams of 95 percent NaOH dissolved in 500 cubic centimeters of water. The mixed liquids are stirred under nitrogen flush and reflux condenser, and 9.1 cubic centimeters of 10 percent aqueous solution of benzyl triethyl ammonium chloride catalyst is added. Phosgene gas 27.5 grams is bubbled into the stirred emulsion evenly over a one-hour period, using a cold water bath to keep the temperature at 30° C. The emulsion is stirred for another hour at 30° C. to complete the reaction. The emulsion is acidified with dilute HCl, and the organic layer of copolymer dissolved in ethylene chloride is separated and precipitated by the rapid addition of 1000 cubic centimeters of methanol to a viscous yellow liquid. This liquid is re-dissolved in 500 cubic centimeters of methylene chloride, dried over calcium chloride, and concentrated by vacuum evaporation at room temperature to a viscous solution. When this solution is spread on aluminum and steel panels, evaporated, and oven-dried, the resulting coatings are clear, light-colored, adhesive, flexible on mandrel test, Sward hardness 44, and drop impact 28 inch pounds.

The present invention may be embodied in other forms or carried out in other ways without departing from the spirit or essential characteristics thereof. The present embodiment is therefore to be considered as in all respects

We claim:
1. A polycarbonate resin produced by reacting (1) an ester forming derivative of carbonic acid selected from the group consisting of phosgene and a carbonic acid diester, and (2) the reaction product obtained by heating a mixture of from about 10 to about 90 weight percent of a fatty oil and from about 90 to about 10 weight percent of a bisphenol selected from the group consisting of bisphenols having the structure

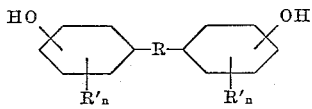

in which R is a member of the group consisting of the divalent alkane and saturated alicyclic radicals and the divalent aryl and aralkyl radicals containing only aromatic unsaturation, R' is a monovalent alkane radical and $n$ is an integer from 0 to 4, and the derivatives of those bisphenols which contain halogen attached to carbon in an aromatic ring, wherein at least 0.1 mol of said ester forming derivative of carbonic acid is employed per mol of the bisphenol.

2. A polycarbonate resin produced by reacting (1) a carbonic acid diester, and (2) the reaction product obtained by heating a mixture of from about 10 to about 90 weight percent of a fatty oil and from about 90 to about 10 weight percent of a bisphenol selected from the group consisting of bisphenols having the structure

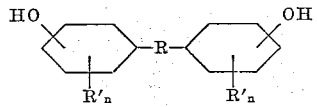

in which R is a member of the group consisting of the divalent alkane and saturated alicyclic radicals and the divalent aryl and aralkyl radicals containing only aromatic unsaturation, R' is a monovalent alkane radical and $n$ is an integer from 0 to 4, and the derivatives of those bisphenols which contain halogen attached to carbon in an aromatic ring, wherein at least 0.1 mol of said carbonic acid diester is employed per mol of the bisphenol.

3. A polycarbonate resin produced by reacting (1) phosgene and (2) the reaction product obtained by heating a mixture of from about 10 to about 90 weight percent of a fatty oil and from about 90 to about 10 weight percent of a bisphenol selected from the group consisting of bisphenols having the structure

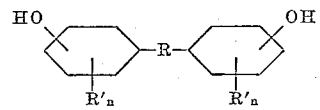

in which R is a member of the group consisting of the divalent alkane and saturated alicyclic radicals and the divalent aryl and aralkyl radicals containing only aromatic unsaturation, R' is a monovalent alkane radical and $n$ is an integer from 0 to 4, and the derivatives of those bisphenols which contain halogen attached to carbon in an aromatic ring, wherein at least 0.1 mol of said phosgene is employed per mol of the bisphenol.

4. A polycarbonate resin according to claim 3 wherein said bisphenol is 2,2-(4,4'-dihydroxy-diphenyl)-propane.

5. A polycarbonate resin according to claim 3 wherein said bisphenol is 1,4-(4,4'-dihydroxy-dicumyl)-benzene.

6. A polycarbonate resin according to claim 4 wherein said fatty oil is dehydrated castor oil.

7. A polycarbonate resin according to claim 4 wherein said fatty oil is coconut oil.

8. A coating composition comprising a polycarbonate resin according to claim 1 and from about 40 to about 95 percent by weight of a volatile organic solvent having a boiling point of from about 30° C. to about 175° C.

9. A coating composition comprising a polycarbonate resin according to claim 2 and from about 40 to about 95 percent by weight of a volatile organic solvent having a boiling point of from about 30° C. to about 175° C.

10. A coating composition comprising a polycarbonate resin according to claim 3 and from about 40 to about 95 percent by weight of a volatile organic solvent having a boiling point of from about 30° C. to about 175° C.

11. A process for the preparation of a polycarbonate resin which comprises (1) reacting together from about 10 to about 90 weight percent of a fatty oil and from about 90 to about 10 weight percent of a bisphenol selected from the group consisting of bisphenols having the structure

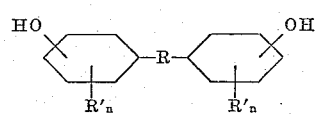

in which R is a member of the group consisting of the divalent alkane and saturated alicyclic radicals and the divalent aryl and aralkyl radicals containing only aromatic unsaturation, R' is a monovalent alkane radical and $n$ is an integer from 0 to 4, and the derivatives of those bisphenols which contain halogen attached to carbon in an aromatic ring at a temperature of between the melting point and the boiling point of said bisphenol, (2) reacting said reaction product (1) with at least 0.1 mol of an ester forming derivative of carbonic acid selected from the group consisting of phosgene and a carbonic acid diester per mol of bisphenol, and (3) recovering the polycarbonate resin from the resulting reaction mixture.

12. A process for the preparation of a polycarbonate resin which comprises (1) reacting together from about 10 to 90 weight percent of a fatty oil and from about 90 to about 10 weight percent of a bisphenol selected from the group consisting of bisphenols having the structure

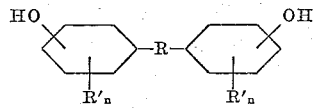

in which R is a member of the group consisting of the divalent alkane and saturated alicyclic radicals and the divalent aryl and aralkyl radicals containing only aromatic unsaturation, R' is a monovalent alkane radical and $n$ is an integer from 0 to 4, and the derivatives of those bisphenols which contain halogen attached to carbon in an aromatic ring at a temperature of between the melting point and the boiling point of said bisphenol, (2) reacting said reaction product (1) with at least 0.1 mol of a carbonic acid diester per mol of bisphenol at a temperature of from about 50° C. to about 320° C., and (3) recovering the polycarbonate resin from the resulting reaction mixture.

13. A process for the preparation of a polycarbonate resin which comprises (1) reacting together from about 10 to about 90 weight percent of a fatty oil and from about 90 to about 10 weight percent of a bisphenol selected from the group consisting of bisphenols having the structure

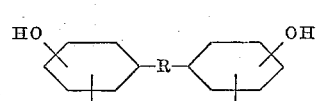

in which R is a member of the group consisting of the divalent alkane and saturated alicyclic radicals and the divalent aryl and aralkyl radicals containing only aromatic unsaturation, R' is a monovalent alkane radical and $n$ is an integer from 0 to 4, and the derivatives of those bisphenols which contain halogen attached to carbon in an aromatic ring at a temperature of between the melting point and the boiling point of said bisphenol, (2) reacting said reaction product (1) with at least 0.1 mol of phosgene per mol of bisphenol in a solution containing at least one mol of pyridine per mol of bisphenol, and (3) recovering the polycarbonate resin from the resulting reaction mixture.

14. A process for the preparation of a polycarbonate resin which comprises (1) reacting together from about 10 to about 90 weight percent of a fatty oil and from about 90 to about 10 weight percent of a bisphenol selected from the group consisting of bisphenols having the structure

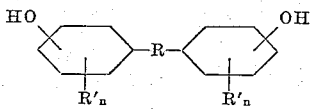

in which R is a member of the group consisting of the divalent alkane and saturated alicyclic radicals and the divalent aryl and aralkyl radicals containing only aromatic unsaturation, R' is a monovalent alkane radical and $n$ is an integer from 0 to 4, and the derivatives of those bisphenols which contain halogen attached to carbon in an aromatic ring at a temperature of between the melting point and the boiling point of said bisphenol, (2) reacting said reaction product (1) with at least 0.1 mol of phosgene per mol of bisphenol in an aqueous alkaline medium, and (3) recovering the polycarbonate resin from the resulting reaction mixture.

15. A process according to claim 14 wherein said reaction (2) is conducted in the presence of a quaternary ammonium compound as a catalyst.

16. A process according to claim 15 wherein said reaction (2) is conducted in the presence of an inert solvent which is immiscible in water.

17. A process according to claim 16 wherein said bisphenol is 2,2-(4,4'-dihydroxy-diphenyl)-propane.

18. A process according to claim 16 wherein said bisphenol is 1,4-(4,4'-dihydroxy-dicumyl)-benzene.

19. A process according to claim 17 wherein said fatty oil is dehydrated castor oil.

20. A process according to claim 17 wherein said fatty oil is coconut oil.

References Cited in the file of this patent
UNITED STATES PATENTS

| | | |
|---|---|---|
| 2,588,821 | Geiger | Mar. 29, 1955 |
| 3,028,365 | Schnell et al. | Apr. 3, 1962 |
| 3,030,331 | Goldberg | Apr. 17, 1962 |